United States Patent [19]

Hill et al.

[11] Patent Number: 5,579,816

[45] Date of Patent: Dec. 3, 1996

[54] BOOM-MOUNTED MANIPULATING GRAPPLE

[76] Inventors: Terrence R. Hill, P.O. Box 462, Greely, Ontario K0A 1Z0, Canada; Bruce A. Hackett, 1811 Groves Road, R.R. #2, Russell, Ontario K4R 1E5, Canada

[21] Appl. No.: 381,527

[22] Filed: Feb. 1, 1995

Related U.S. Application Data

[63] Continuation-in-part of Ser. No. 189,644, Feb. 1, 1994, Pat. No. 5,441,090.

[51] Int. Cl.$^6$ .................................................. A01G 23/08
[52] U.S. Cl. ...................... 144/4.1; 144/34.1; 144/24.13; 414/694
[58] Field of Search .................................. 144/4.1, 34.1, 144/24.13, 335, 336, 343; 294/67.5, 103.2; 414/684, 694, 785, 910, 911; 30/379, 379.5; 83/928

[56] References Cited

U.S. PATENT DOCUMENTS

| | | | |
|---|---|---|---|
| 4,083,463 | 4/1978 | Ericsson | 144/4.1 |
| 4,412,777 | 11/1983 | Forslund | 144/4.1 |
| 5,082,036 | 1/1992 | Veerikko | 144/4.1 |
| 5,101,872 | 4/1992 | Schuren | 144/4.1 |
| 5,107,912 | 4/1992 | Côte et al. | 144/4.1 |
| 5,377,730 | 1/1995 | Hamilton | 144/4.1 |
| 5,378,852 | 1/1995 | Manor | 144/335 |
| 5,390,715 | 2/1995 | Luscombe | 144/393 |
| 5,441,090 | 8/1995 | Hill et al. | 144/34.1 |
| 5,501,257 | 3/1996 | Hickman | 144/335 |

*Primary Examiner*—W. Donald Bray
*Attorney, Agent, or Firm*—Adrian Zahl

[57] ABSTRACT

A boom-mounted grappling and manipulating apparatus is provided that may be rotatably mounted on a vehicle, comprising an articulated boom with a grappling and manipulating head rotatably and pivotally mounted thereto. The head is provided with opposable jaws comprising jaw members that apply an even pressure to an object being gripped. A drive coupling may be provided to provide a continuous rotary link between hydraulic lines on the boom with lines the head. The coupling comprises a coupling body rotatably housed within a sheath with a groove between the coupling body and the sheath. The groove permits fluid to be transmitted from the body to the sheath while they are rotated relative to each other. The boom may be provided with a link joining two of the segments, provided with dual articulated cylinder mounts on opposing sides and capable of permitting approximately 360 degrees of rotation between the segments.

14 Claims, 5 Drawing Sheets

BOOM-MOUNTED MANIPULATING GRAPPLE

FIELD OF THE INVENTION

This is a continuation-in-part of applicant's application Ser. No. 08/189,644, filed Feb. 1, 1994 now U.S. Pat. No. 5,441,090.

The present invention relates to a rotatable and maneuverable grappling head that may be mounted to a vehicle-mountable boom.

BACKGROUND OF THE INVENTION

Grappling heads mounted to booms serve a variety of mechanized functions. For example, the tree-cutting and delimbing device disclosed in applicant's co-pending application Ser. No. 08/189,644, now U.S. Pat. No. 5,441,090 discloses a boom-mounted head having a saw mounted thereto, adapted to cut trees and limbs, with the jaws of the head adapted to grapple tree trunks and limbs and loose brush. Another useful function of a grapple is to rotatably drive an auger and, after a hole is drilled, to manipulate and transport a pole for insertion within the hole. Other uses abound. Several features are desirable in a grapple to serve these various functions. The head must be highly maneuverable, and capable of being placed by the boom in virtually any position. It must be able to reach over, under or around obstructions. It should be continuously rotatable, in order to permit it to rotate an auger. The jaws of the head should be capable of evenly gripping either a regular or an irregularly-shaped object, and for this purpose the individual teeth that comprise the jaws should be independently-pivoted and driven by drive means adapted to supply an even force to all teeth regardless of their position.

A grappling head is typically are mounted to an articulated, or "knuckle", boom with the boom and head being driven by a hydraulic or other drive means. While knuckle booms and various types of grappling heads are well known in the art, prior such systems suffer from not having a full range of control in all planes, nor are the heads continuously rotatable.

Typically, the head in a boom-mounted device comprises a set of jaws adapted to grip an object, with the head having some degree of maneuverability. There may be provided as well a saw for cutting tree or brush. An example is shown in Canadian Patent 1,224,704 (Gaitten), wherein an articulated boom mounted to a truck is provided with a cutting head at its free end. The cutting head includes a set of jaws for gripping a tree limb or trunk, and a longitudinally-slidable circular saw. However, the Gaitten device does not include a boom having a sufficient degree of articulation to reach around or behind obstructions.

In order to achieve these objects, the head may be mounted on an articulated boom, with a linkage that permits the head to both pivot and rotate in much the same manner as a human arm and wrist permit the hand to be positioned in any orientation. Preferably, the head should be continuously rotatable relative to the boom; this requires the use of a rotary drive coupling to permit the hydraulic lines or other drive and control means driving the head to remain coupled with the boom without the lines twisting. Preferably, at least one of the segments of the boom should be extensible. As well, one of the joints of the boom may be provided with means to pivot by a full, or nearly full, 360 degrees; this permits an operator to extend the head underneath obstructions, such as power lines, and bring the head upwardly and rearwardly around the obstruction.

These and other objects are addressed by the present invention.

SUMMARY OF THE INVENTION

In its broadest scope, a first aspect of the present invention comprises a gripping and manipulating apparatus that may be rotatably mounted on a vehicle, comprising an articulated boom with a gripping and manipulating head rotatably mounted thereto. The head is provided with a rotary coupling for the continuous rotation of the head relative to the boom, with the coupling comprising an axle housed within an axle housing extending from the head and the boom. The head is further provided with a pivot for pivotal movement of the head relative to the boom. The head may be provided with opposing jaw members comprised of individual teeth, each tooth being independently pivoted and linked to drive means that drive the teeth such that they apply an even pressure to an object being gripped thereby. A drive coupling is preferably provided to provide a continuously rotatable link between hydraulic drive conduits extending along the boom with conduits on the head. The drive coupling comprises a coupling body rotatably housed within a sheath. Hydraulic fluid is transmitted through an aperture extending through the coupling body into a groove between the coupling body and the sheath, with the groove communicating with an aperture extending through the sheath. The sheath aperture communicates with a fluid conduit engaged thereto, which may be linked to a jaw member or other component of the head driven by hydraulic drive means.

The invention further comprises a boom-mounted gripping and manipulating head as described above, mounted to a vehicle. A further aspect of the invention is a gripping and manipulating head by itself, as described above, for engagement to a boom.

The invention further comprises a segmented boom for use with a gripping and manipulating head. The boom may be provided with a 360 degree pivot link joining two of the segments. The link comprises a rigid link member pivotally engaged at either end thereof to a respective boom segment. Two hydraulic cylinders or other drive means are each pivotally engaged at one end thereof to a respective boom segment and at the other end thereof to an upper and lower articulated mount, respectively, each pivotally engaged to the link member. The boom segments may include an angled portion adjacent the link member to facilitate rotation. A first of said angled portions angles upwardly and a second portion angles downwardly, when viewed from the link member with the boom positioned generally horizontally.

DETAILED DESCRIPTION OF THE PREFERRED EMBODIMENT

Figure 1:
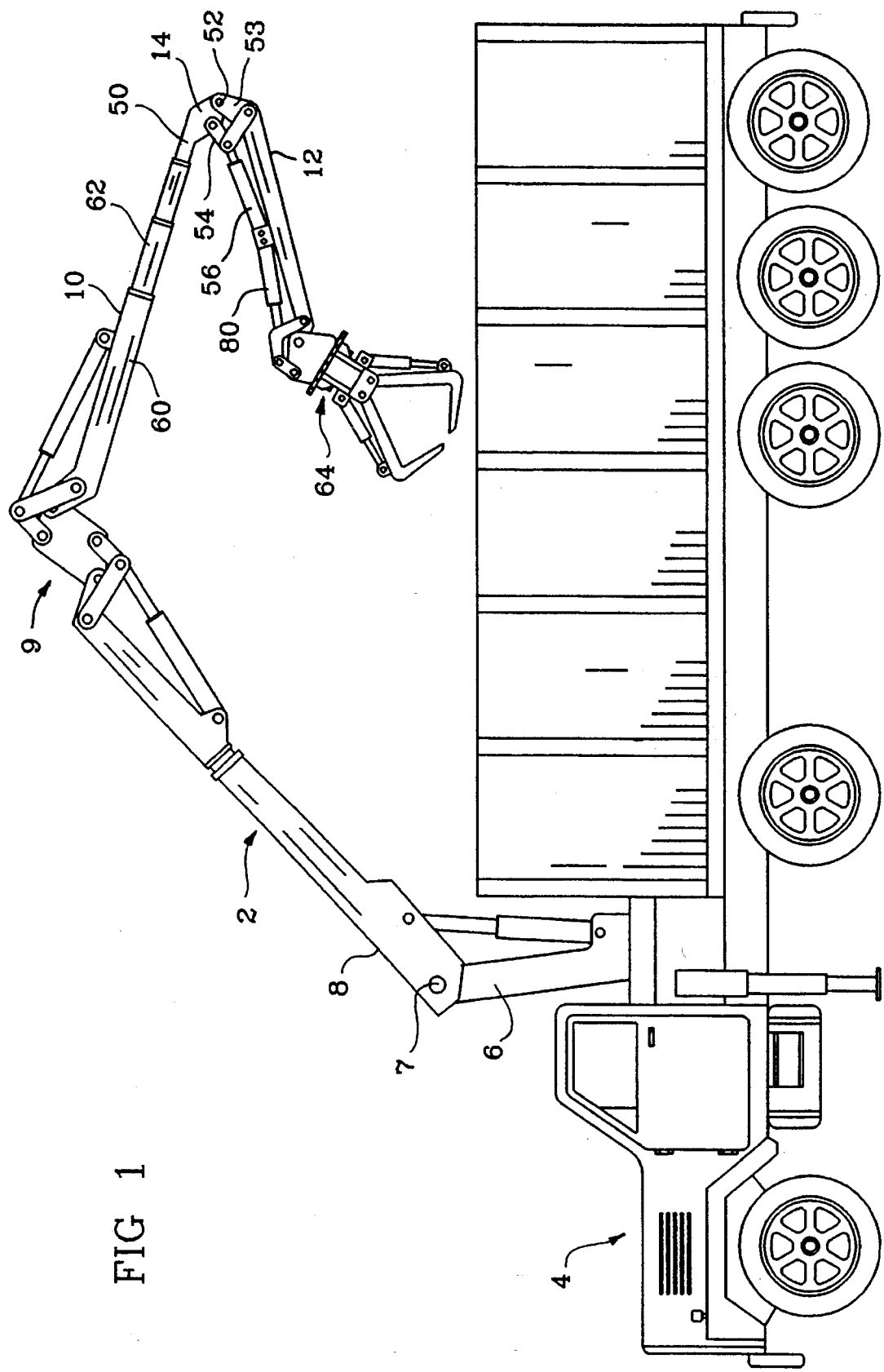
FIG. 1 is a perspective view of a grapple according to the present invention, mounted to a vehicle.

Turning to FIG. 1, the boom 2 of the present invention is rotatably mounted at its base to a truck or other large vehicle 4. Hydraulic lines, which are omitted from the drawings herein for clarity, extend to each of the hydraulically-driven cylinders and motors on the boom and grappling head. The hydraulic lines are fed by a pressurized fluid source, not shown, within the truck or mounted thereto and driven by the truck motor. The hydraulic lines are linked to a control unit, not shown, mounted to the truck or the base of the boom and linked in turn to the hydraulic drive. The operator of the device may stand or sit at the base of the boom to operate the boom and grappling head. Alternatively, the operator may operate the device by way of a remote control unit operatively linked by way of a radio signal to the control unit, as is known in the art. The hydraulic lines are preferably housed within the interior of the boom or within external holders mounted to the boom that allow the lines to accommodate the pivotal and rotational movement and extensions of the boom. It will be understood that although the preferred embodiment employs a hydraulic drive system, the device may be driven by any means capable of providing sufficient motivating force to drive the boom and grappling head. For example, the hydraulics could be replaced by an air or cable driven system, or an arrangement of electric motors.

The boom comprises four articulated segments 6, 8, 10 and 12, respectively, with a first segment 6 comprising the base of the boom and a fourth segment 12 comprising its terminus. The first and second segments are pivotally joined together by way of a pivot pin 7. The second and third segments 8 and 10 are pivotally joined together by way of a 360 degree pivot link 9, illustrated in greater detail in FIG. 7, that permits these segments to pivot by approximately 360 degrees relative to each other. Turning to FIG. 7, the pivot link 9 comprises a generally parallelogram-shaped link body 20 pivotally engaged at its acute corners to respective ends of the second and third boom segments 8 and 10. The link body may comprise a pair of parallel, spaced apart plates linked by rigid connectors, not shown. The boom ends facing the link body 20 terminate in first and second link mounts 22 and 24, respectively, each comprising a pair of tabs that sandwich the link body. A pivot 26 pivotally joins the link body to each link mount. The link mounts 22, 24 are angled relative to the respective booms, with the first mount 22 being angled downwardly and the second mount 24 being angled upwardly, when viewed facing the link body with the boom positioned generally horizontally. Lower and upper longitudinally extensible expansion means 27 and 28, which preferably comprise hydraulic cylinders, extend from the second and third segments, respectively. The base of each cylinder is mounted to a corresponding segment, and its arm is connected to a corresponding articulated cylinder mount 30 and 32, respectively. Each cylinder mount comprises first and second arms 34 and 36 pivotally engaged to each other by way of a central pivot 38. The distal ends of each arm are pivotally mounted to a respective boom segment and to opposing obtuse corners of the link body.

In use, retraction of the lower cylinder in tandem with extension of the upper cylinder folds the third segment inwardly and downwardly until it folds underneath the second segment. Reverse action of the cylinders folds the third segment in the opposite direction, until it is folded over the second segment. The pivotal action of the segments allows the head to be extended underneath and behind obstacles, for example if an object must be retrieved from above and behind a set of utility lines, and obstructions prevent the operator from reaching over the lines. In this case, the operator must reach under the lines and manoeuvre the head upwardly and in some cases rearwardly to reach the limb.

Turning to FIG. 1, the third and fourth segments 10, 12 are linked by an elbow link 50 that permits these segments to fold together with about 180 degrees of rotation therebetween. The elbow link 50 comprises a pivot pin 52 linking angled end portions 53 of the respective boom segments. A folding cylinder mount 54 links the respective end portions, with a hydraulic cylinder 56 being pivotally mounted to the central pivot of the cylinder mount.

The articulation of the boom segments allows the grappling head to grip and remove objects from behind obstructions such as utility cables. It will be understood that a boom may be provided having a different number of segments, and still be capable of providing this function, to a greater or lesser degree. The articulation of all segments of the boom is aligned on a single plane, referred to herein as the "boom plane". It will be understood that one or more segments may be offset, in order to facilitate folding of the boom during transport, and lie on a plane parallel to the boom plane.

Pivotal movement of the segments relative to each other is driven by hydraulic cylinders linking adjacent segments and controlled by the control unit. The first segment is rotatably mounted to the truck 4, and is rotated by way of a hydraulic actuator, not shown.

The third segment 10 of the boom is longitudinally extensible, and comprises an outer sleeve 60 housing inner boom members 62. The inner boom members are hydraulically actuated to selectively retract and extend from the sleeve 60.

A rotary coupling connects the end of the fourth segment to a cutting head 64, as shown more particularly in FIGS. 2 through 6, and permits continuous rotation of the head relative to the boom. The directional references used herein refer to the head in the generally downwardly-pointing position illustrated in the drawings, although it will be understood that this component may be positioned in any orientation. In addition to the rotary coupling, a pivot joint between the head and the boom permits the head to be pivoted by 180 degrees on the boom plane. The combination of the rotary coupling and the 180 degree pivot capability of the pivot joint permits the operator to position the grappling head in virtually any position or orientation. The grappling head is engaged to the boom by way of a mount, comprising first and second parallel spaced apart mount plates 70, 72 extending upwardly from a base structure 74. The mount plates sandwich and pivotally engage the end of the fourth segment by way of a pivot pin 76 extending through the plates and the end of the fourth segment. An anchor 78 extends upwardly from the first mount plate 70, and serves as an attachment point for a hydraulic cylinder 80, seen in FIG. 1, which in turn pivots the head on the boom plane. The anchor is comprised of two arms pivotally engaged to each other, with one arm being pivotally engaged to the first mounting plate 70 and the second arm being pivotally engaged to the boom segment 12 adjacent the end thereof. The double pivotal engagement provided by the anchor 78 permits the head to pivot 180 degrees on the boom plane.

Figure 3:
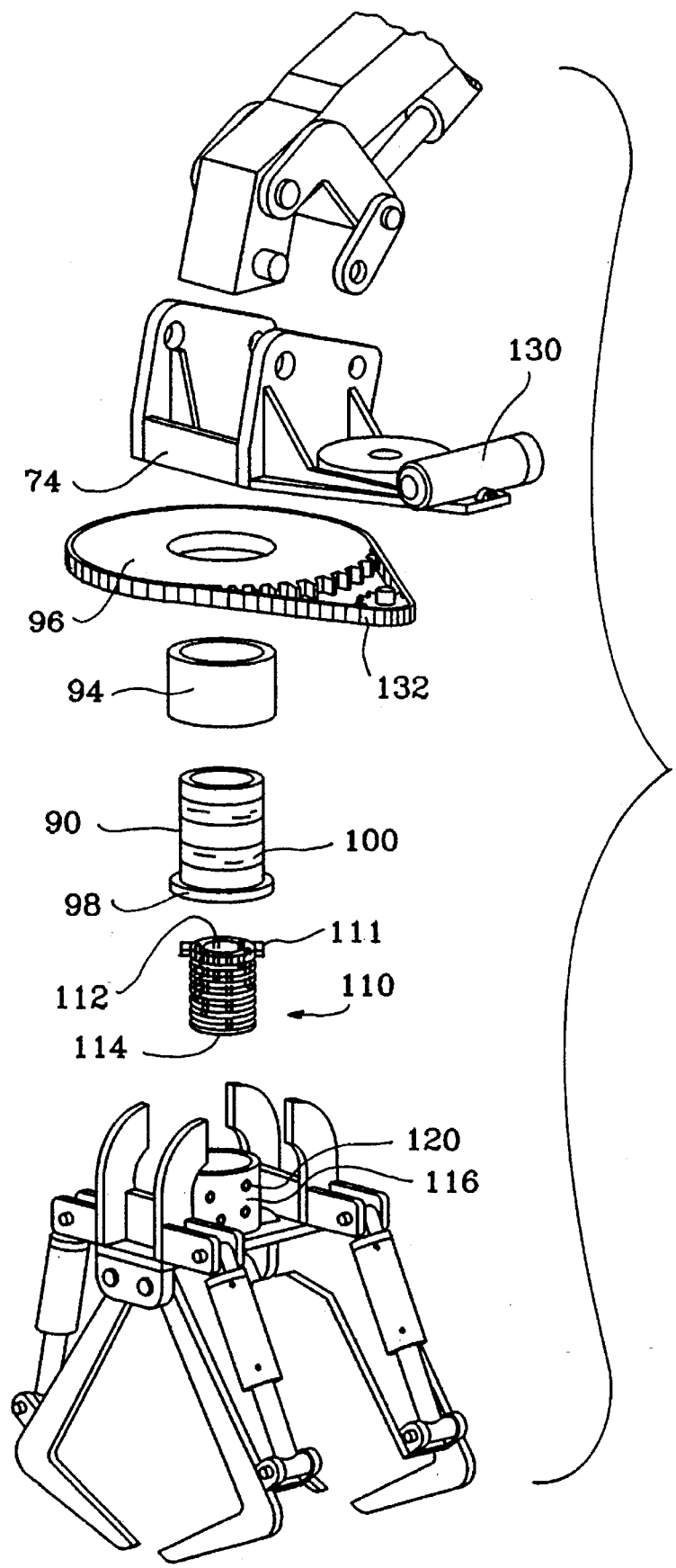
FIG. 3 is an exploded view of the grappling head.

Turning to FIG. 3, the rotary coupling comprises a hollow axle 90 bolted to the lower face of the base structure 74 and extending downwardly therefrom. The axle 90 is housed within a bushing 94 extending downwardly from the lower face of a rotator gear 96, and is held therein by a flange 98 extending outwardly from the lower margin of the axle. An array of annular teflon inserts 100 provide antifriction means between the axle and bushing. The bushing 94 is welded or bolted to the lower face of the rotator gear, and as well is fixedly linked to the lower portion of the head by way of yoke 134 extending outwardly from the bushing and welded to the lower portion of the head, as described in greater detail below.

Hydraulic drive coupling means will now be described that serve to couple the hydraulic conduits on the boom with corresponding conduits on the head and permit continuous rotation of the head relative to the boom. Apertures within the base plate 74 and the rotator gear 96 communicate with the hollow interior of the axle, and permit hydraulic conduits to extend through the axle into the cylindrical body 110 of a rotary coupling positioned partly within the axle and extending from the lower open end of the hollow interior thereof. The rotary coupling body is engaged to the axle by way of tabs 111 extending radially outwardly from the upper rim of the coupling body and that engage corresponding brackets, not shown, extending inwardly from the interior wall of axle. Each hydraulic conduit is connected to an aperture 112 extending through the body 110, and communicating with an annular groove 114 recessed into the face of the coupling body. A coupling sheath 116 surrounds the body and is rotatable relative thereto. In use, the coupling body 110 remains stationary relative to the base plate 74, and the sheath rotates with the drive gear and bushing. Hydraulic fluid entering the apertures 112 passes into the annular grooves 114, and exits the sheath 116 through apertures 120 extending therethrough. Hydraulic conduits, not shown, engaged to the head receive fluid discharged from the apertures to drive the saw and jaws of the head.

The rotator gear 96 is rotatably driven by a hydraulic motor 130 linked to a chain 132 engaged to the toothed rim of the gear.

Figure 2:
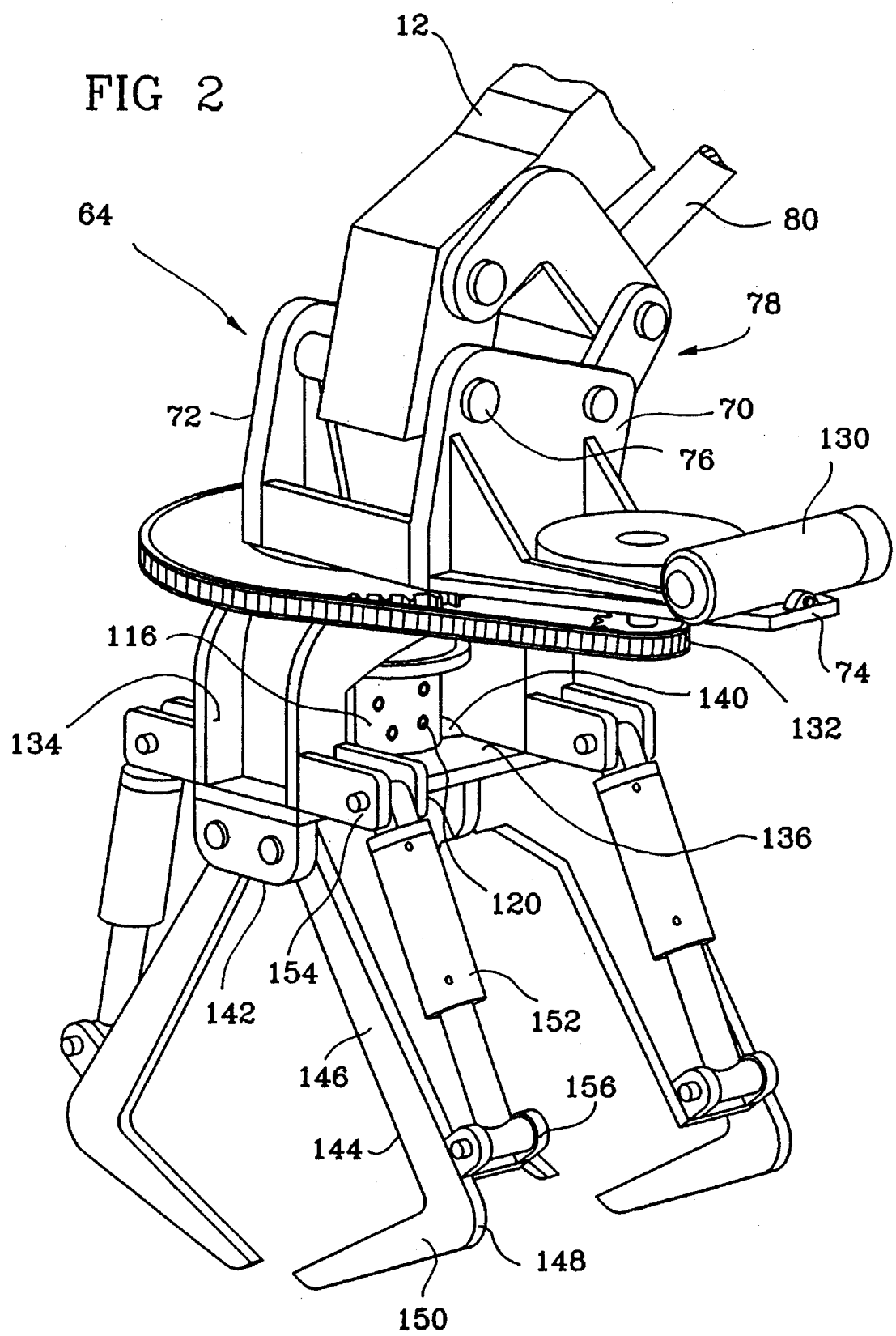
FIG. 2 is a perspective view of the grappling head.
Figure 4:
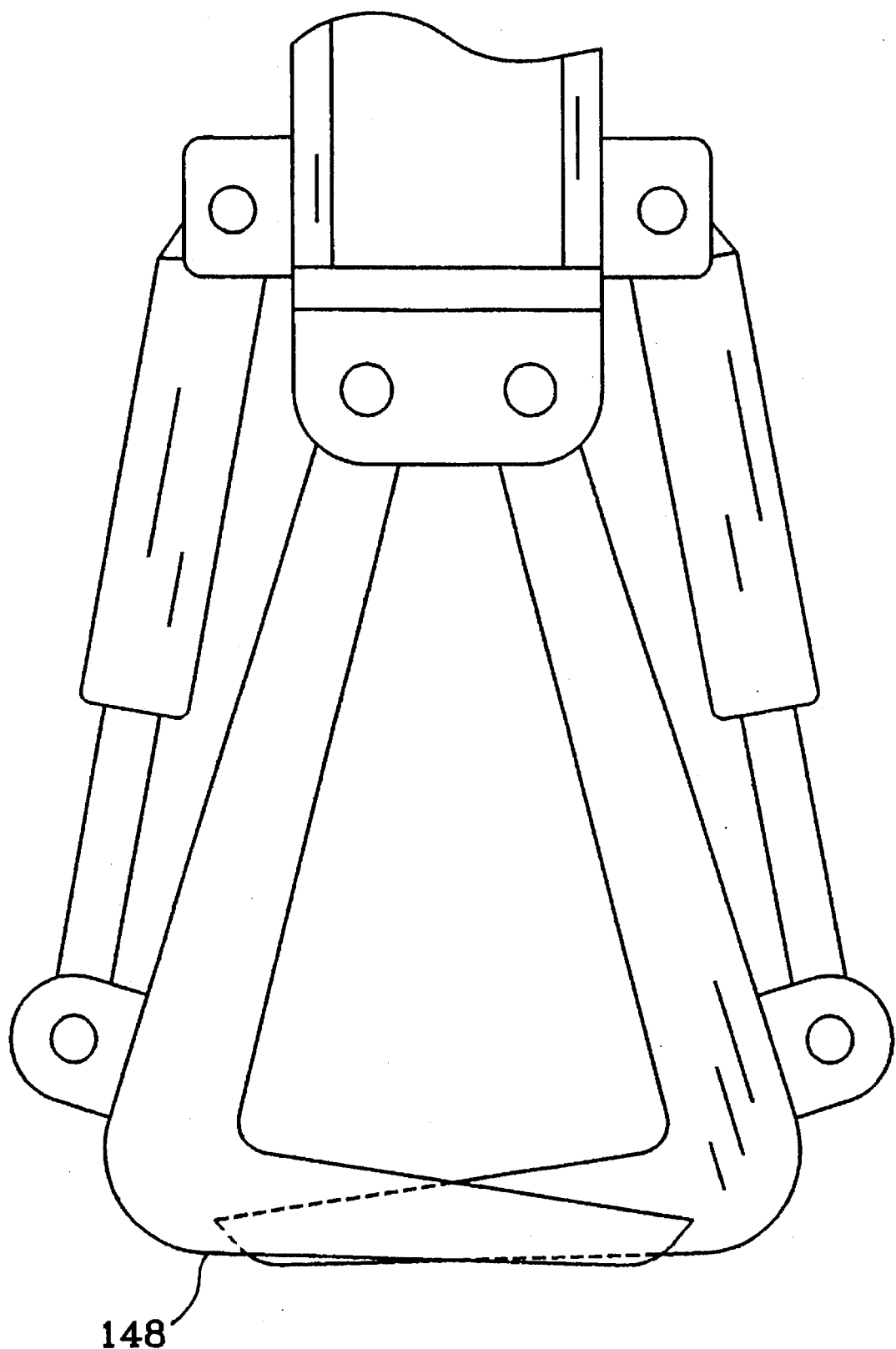
FIG. 4 is a side elevational view of the grappling head, showing the jaws in the partially closed position.
Figure 5:
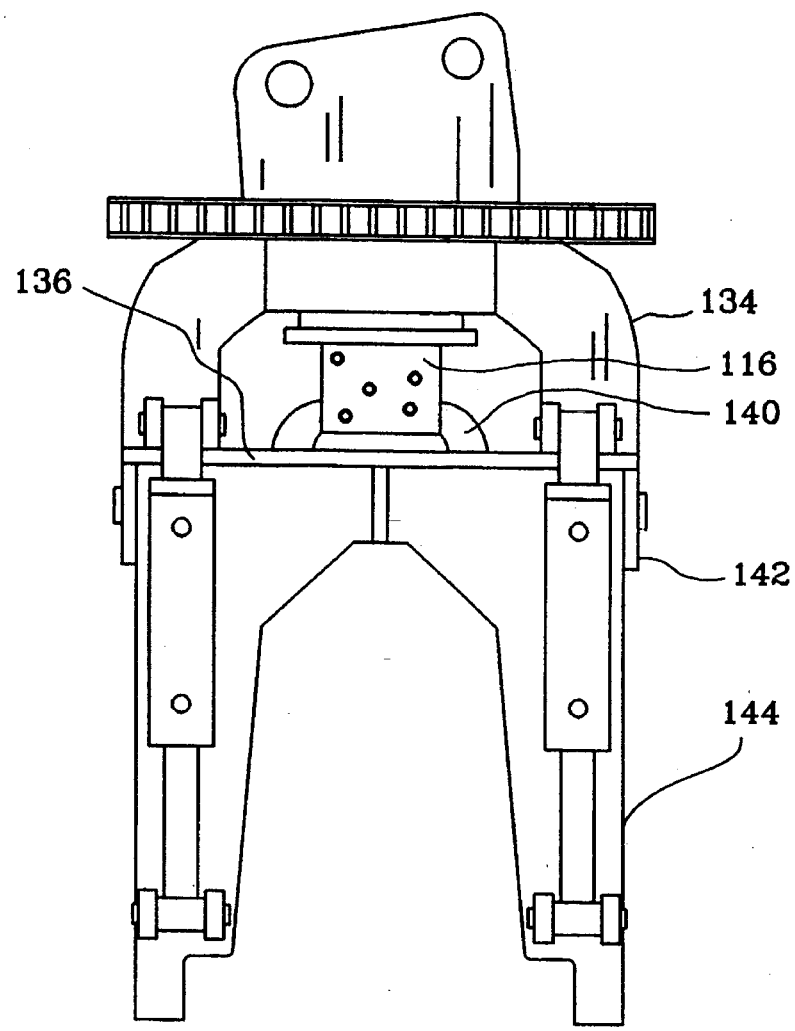
FIG. 5 is a front elevational view of the grappling head.
Figure 6:
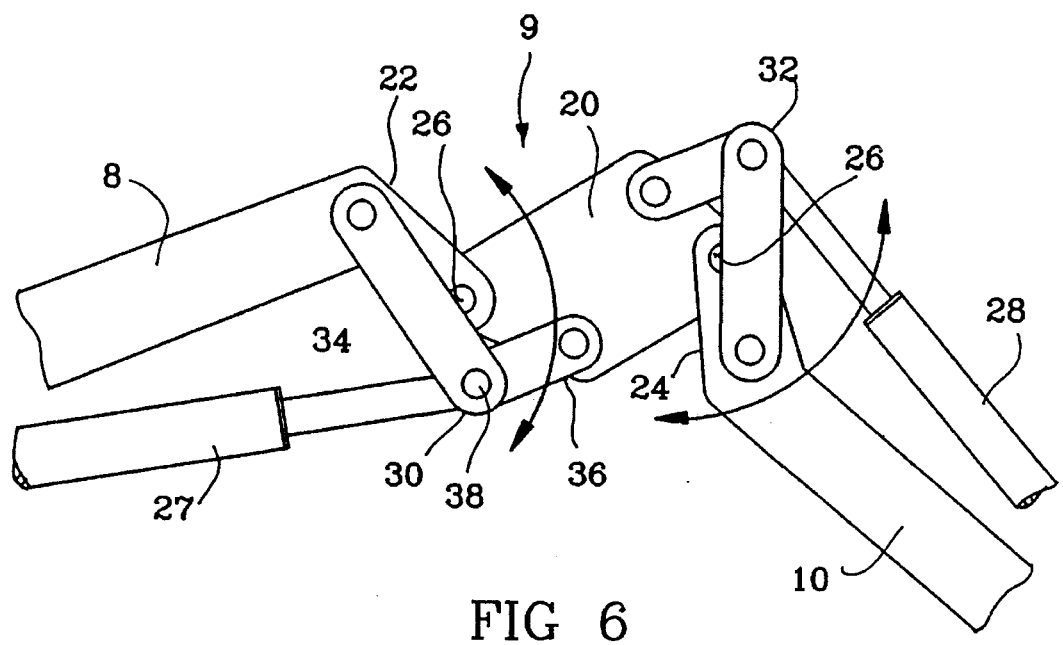
FIG. 6 is a side elevational view of a portion of the boom, illustrating the 360 degree pivot link member.

Turning to FIG. 2, the yoke 134 is mounted to the bushing 94 and extends downwardly therefrom. The free lower ends of the yoke engage an elongate base plate 136 that spans the yoke. The coupling sheathing 116 of the rotary coupling is mounted to the base plate by way of brackets 140. Jaw pivot members 142 depend downwardly from each end and the middle of the base plate, each comprising a plate having pivot engagement points at each side thereof to which a jaw member 144 is pivotally engaged. The base plate defines a throat from which the jaw members 144 extend. Each jaw member, comprising a body 146 merging at an elbow 148 with an elongate, inwardly-oriented tooth 150, pivots independently of its neighbours, and is independently actuated by a hydraulic cylinder 152 linking the jaw member with an end of the yoke 134. Opposing jaw members are offset from each other to allow them to grip a small object when drawn together, as seen in FIG. 4. Each cylinder 152 is pivotally engaged at its upper and lower ends to cylinder support brackets 154 and 156, respectively, extending from the lower ends of the yoke and the elbow of the tooth, respectively. The hydraulic lines feeding the cylinders 152 are linked to the main fluid source, not shown. Thus, an even pressure is applied to all the cylinders to cause the jaw members to all apply an even pressure on an object being gripped by the jaws, whether the object is regular in shape or irregular. During the gripping operation, the even grip of the jaw members minimizes lateral or rotational stresses that may be placed on the boom or on the object, if the object is, for example, a tree limb that is still attached to the tree.

Although the present invention has been described by way of a preferred embodiment thereof, it will be seen by those skilled in the art that variations may be made to the invention without departing from the spirit and scope thereof, as defined by the appended claims.

We claim:

1. A boom-mounted manipulating grapple, comprising a segmented articulated boom and a gripping head rotatably mounted thereto, wherein said boom is provided with multiple articulations and said head comprises: a body; a pivot mounted to said body for pivotal movement of said head relative to said boom; opposing jaw members pivotally-mounted to said body; and a rotary coupling for the continuous rotation of said head relative to the boom, said rotary coupling comprising an axle rotatably housed within an axle housing extending from said boom and said head, respectively, and gear means co-axial with said axle and linked to a drive motor for the continuous rotation of said head relative to said boom.

2. Apparatus as claimed in claim 1, wherein said jaw members are each comprised of teeth, each of said teeth being pivotally-mounted to said head and linked to drive means adapted to apply an even force to all of said teeth to cause all of said teeth to evenly grip an object.

3. An apparatus as claimed in claim 2, wherein said drive means comprises pressurized hydraulic fluid fed from a common source to hydraulic cylinders engaged to said jaw members.

4. An apparatus as claimed in claim 1, wherein said rotary coupling further includes hydraulic fluid drive coupling means to transmit hydraulic drive means from said boom to said head during continuous rotation of said head relative to said boom, said coupling means comprising a coupling body rotatably housed within a sheath, said coupling body and said sheath both having an aperture extending therethrough communicating with a circumferential groove recessed between said sheath and said coupling body, said apertures and said groove being adapted for the transmission of pressurized hydraulic fluid.

5. An apparatus as claimed in claim 1, wherein a segment of said boom is longitudinally extensible.

6. An apparatus as claimed in claim 1, wherein said boom includes a linkage connecting adjacent segments thereof, said segments having upper and lower faces, said linkage comprising a linkage body having upper and lower portions, said linkage body being pivotally engaged to both of said segments and having first and second articulated mount arms each having first and second ends, said first arm being pivotally engaged at a first end thereof to said upper portion of said linkage body and said second arm being pivotally engaged at a first end thereof to said lower portion of said linkage body, both of said arms being pivotally engaged at said second end to a corresponding boom segment, said boom further including longitudinally extensible expansion means extending from said upper and lower faces, respectively, of said boom segments.

7. Apparatus as claimed in claim 6, wherein said longitudinally extensible expansion means comprises a hydraulically-driven cylinder.

8. An apparatus as claimed in claim 6 wherein said linkage body comprises a generally parallelogram-shaped body, the acute corners thereof each being pivotally engaged to respective boom segments and the obtuse corners thereof each being pivotally engaged to an end of said mount arms.

9. An apparatus as claimed in claim 6 wherein said adjacent boom segments each include an angled portion facing said linkage body, a first of said angled portion angling upwardly and a second angling downwardly, when viewed from said linkage body with said boom being positioned generally horizontally.

10. A vehicle having a boom-mounted manipulating grapple rotatably mounted thereto, said boom comprising multiple segments, said grapple being pivotally and rotatably mounted to said boom and having a rotary coupling linking said boom and grapple and having continuous rotation means to permit the continuous rotation of said grapple relative to the boom, said continuous rotation means comprising an axle rotatably housed within an axle housing extending from said boom and said grapple, respectively, and ear means co-axial with said axle and linked to a drive motor for the continuous rotation of said grapple relative to said boom, said grapple further characterized by jaw members pivotally mounted thereto and linked to drive means adapted to apply an even actuating force to all jaw members to cause said jaw members to evenly grip an object.

11. A vehicle as claimed in claim 10, wherein said boom includes a linkage connecting adjacent segments thereof, said linkage comprising a linkage body pivotally engaged to both of said segments and having dual articulated drive cylinder mount arms each pivotally engaged at one end to upper and lower sides, respectively, of said linkage body, and at the other side to one of said boom segments, respectively, for the attachment of drive means extending from upper and lower faces, respectively, of said segments.

12. A vehicle as claimed in claim 10, wherein said rotary coupling further includes drive coupling means to transmit hydraulic drive means from said boom to said head, said coupling means comprising a coupling body rotatably housed within a sheath, said coupling body and said sheath both having an aperture extending therethrough communicating with a circumferential groove recessed between said sheath and said coupling body, said apertures and said groove being adapted for the transmission of hydraulic fluid.

13. A grappling and manipulating head for mounting on a boom, said head having opposing jaw members defined by teeth extending into the mouth of said jaw members and pivotally mounted to a body, each of said teeth being independently actuated by a corresponding hydraulic cylinder with all of said hydraulic cylinders linked to a common fluid source so as to apply an even force to all of said teeth, said head further having rotary coupling means to link said head to a boom, said rotary coupling means comprising an axle rotatably housed within an axle housing mounted to said head and mountable to said boom, and gear means coaxial with said axle and linked to a drive motor for the continuous rotation of said head relative to said boom.

14. A grappling and manipulating head as claimed in claim 13, wherein said rotary coupling further includes drive coupling means to transmit hydraulic drive fluid from said boom to said head, said coupling means comprising a coupling body rotatably housed within a sheath, said coupling body and said sheath both having an aperture extending therethrough communicating with a circumferential groove recessed between said sheath and said coupling body, said apertures and said groove being adapted for the transmission of hydraulic fluid.

* * * * *